(12) United States Patent
Wang (10) Patent No.: US 7,571,674 B2
(45) Date of Patent: Aug. 11, 2009

(54) AUTOMATIC COFFEE BREWING APPARATUS AND CONTROL METHOD

(76) Inventor: Dong-lei Wang, No. 1 Jenfeng Road, Tangjiawan Town, Xiangzhou District, Zuhai City, Guangdong Province (CN)

( * ) Notice: Subject to any disclaimer, the term of this patent is extended or adjusted under 35 U.S.C. 154(b) by 640 days.

(21) Appl. No.: 11/208,796

(22) Filed: Aug. 22, 2005

(65) Prior Publication Data

US 2006/0156928 A1    Jul. 20, 2006

(30) Foreign Application Priority Data

Jan. 19, 2005    (CN) .................... 2005 1 0032859

(51) Int. Cl.
*A47J 31/40* (2006.01)
(52) U.S. Cl. .................... 99/302 P; 99/289 R
(58) Field of Classification Search ............... 99/302 P, 99/302 R, 280, 295, 289 R
See application file for complete search history.

(56) References Cited

U.S. PATENT DOCUMENTS 5,302,407 A * 4/1994 Vetterli .................... 426/433
6,561,079 B1 * 5/2003 Muller et al. ............. 99/282
7,353,752 B2 * 4/2008 Blanc ....................... 99/298

FOREIGN PATENT DOCUMENTS

EP    0486434    * 11/1991

* cited by examiner

*Primary Examiner*—Reginald L Alexander
(74) *Attorney, Agent, or Firm*—Allen, Dyer, Doppelt, Milbrath & Gilchrist, P.A.

(57) ABSTRACT

This invention provides for a coffee brewing apparatus and its control method, which comprises a control circuit and a water loop comprising a water reservoir, a pump, a control valve, a boiler, a brewing assembly, a three-way connector and a connecting hose. When coffee is to be brewed, hot water flows top-down through the brewing chamber cover, the upper filter, the coffee grounds, the lower filter, the brewing chamber, the first port of the three-way connector, the second port of the three-way connector and the connecting hose; the brewed coffee finally flows out from said connecting hose. This coffee brewing apparatus has additional functions of automatic residue discharge, automatic water discharge and automatic cleaning.

10 Claims, 7 Drawing Sheets

AUTOMATIC COFFEE BREWING APPARATUS AND CONTROL METHOD

CROSS-REFERENCE TO RELATED APPLICATION

This application claims priority of CN Patent Application No. 200510032859.1 filed on Jan. 19, 2005, entitled "Automatic Coffee Brewing Apparatus and the Control Method Thereof" which is incorporated herein by reference for all purposes.

TECHNICAL FIELD

This invention relates to an automatic coffee brewing apparatus and the control method thereof, more particularly, to a coffee brewing apparatus having an automatic cleaning function and the control method thereof.

BACKGROUND OF THE INVENTION

In the existing automatic coffee maker, water flows through the brewing system from bottom to top, and the brewing system cannot be cleaned automatically, instead it must be taken out for manual cleaning regularly, otherwise the build-up of coffee residues in the brewing system will become excessive and affect the quality of coffee.

SUMMARY OF THE INVENTION

In order to solve the problem in the prior art coffee maker, in which the brewing system cannot be cleaned automatically, the present invention provides a new type of coffee brewing apparatus and the control method thereof, wherein the coffee brewing system can be cleaned automatically without the need to take it out for manual cleaning.

In accordance with the invention, there is provided an automatic coffee brewing apparatus, comprising:
a control circuit;
a water loop including:
a water reservoir, a pump, a control valve, a boiler, a brewing assembly, a three-way connector having a first, a second and a third port and a connecting hose; wherein said brewing assembly includes a brewing chamber cover, a brewing chamber, an upper filter and a lower filter, wherein said upper filter and lower filter are disposed inside said brewing chamber, and wherein coffee grounds are accommodated between said upper filter and lower filter when coffee is to be brewed; wherein said brewing chamber has a coffee outlet at its bottom, which is connected with the first port of said three-way connector, wherein the second port of said three-way connector is connected with one end of said connecting hose, wherein a plunger assembly is installed for opening and closing at the third port of said three-way connector, wherein another end of said connecting hose is connected to a through hole on the brewing chamber cover opening to the coffee outlet;
wherein, when coffee is to be brewed:
a) coffee grounds are accommodated between the upper and lower filters,
b) the third port of said three-way connector is closed,
c) hot water flows top-down through the brewing chamber cover, the upper filter, the coffee grounds, the lower filter, the brewing chamber, the first port of the three-way connector, the second port of the three-way connector and the connecting hose;
d) the brewed coffee finally flows out from said connecting hose; and,
after the brewed coffee has flowed out, the third port of the three-way connector is opened under the control of the control circuit, wherein waste water remaining in the brewing chamber is discharged from the third port of the three-way connector through the lower filter, the brewing chamber and the first port of the three-way connector.

In accordance with the invention there is further provided a coffee brewing apparatus as above, wherein said lower filter, brewing chamber and three-way connector constitute the brewing core, and wherein said brewing core is rotatable about a pivot axis, so that the brewing chamber can assume one of a brewing position and a position for receiving coffee grounds; wherein in the brewing position, the brewing chamber cover is closed on the brewing chamber, and the coffee grounds are accommodated and compacted between the upper filter and the lower filter; while in the position for receiving coffee grounds, the brewing chamber cover is separated from the brewing chamber, and the lower filter is positioned at the bottom inside the brewing chamber.

Wherein a connecting rod is connected to the bottom of the lower filter, and a through hole is provided at the bottom of the brewing chamber, so that, said connecting rod passes through said hole and is connected with the pivot axis of the brewing core; under the control of the control circuit, said connecting rod is capable of moving the lower filter up and down the brewing chamber. The position where the lower filter arrives at the top of the brewing chamber is called the residue discharge position; a sealing ring is disposed at the inner periphery of the through hole at the bottom of the brewing chamber to prevent the coffee grounds and water from flowing out from the gap at the periphery of the through hole.

In another aspect of the invention, there is provided a method for controlling the coffee brewing apparatus described above, comprising the following steps:
after coffee grounds are received by the brewing core at the position for receiving coffee grounds, the brewing chamber moves to the brewing position and the coffee grounds are compacted, under the control of the control circuit, the water pump begins to pump, and the third port of the three-way connector is closed, such that hot water from the boiler flows top-down through the brewing chamber cover, the upper filter, coffee grounds, the lower filter, the brewing chamber, the first port of the three-way connector, the second port of the three-way connector and the connecting hose, wherein the brewed coffee finally flows out from said connecting hose.

After the brewed coffee has flowed out, the brewing core is rotated about the pivot axis under the control of the control circuit, so that the brewing chamber is separated from the brewing chamber cover; at this time, under the control of the connecting rod connected at the bottom of the lower filter, the lower filter moves inside the brewing chamber to the residue discharge position so as to discharge the residues automatically; under the control of the control circuit, the brewing core is rotated continuously to the position for receiving coffee grounds, and the third port of the three-way connector is opened; before the brewing chamber is returned to the position for receiving coffee grounds, under the control of the connecting rod connected at the bottom of the lower filter, the lower filter undergoes a quick return motion from the residue discharge position to the bottom inside the brewing chamber, which generates an impact to cause the waste water remaining in the brewing chamber under the filter to flush the filter, such that the waste water is discharged automatically and the filter is cleaned automatically.

Thanks to the above technical scheme adopted in this invention, the filter can be cleaned automatically, and waste water can be discharged automatically, without the need to take the brewing core out for manual cleaning.

BRIEF DESCRIPTION OF THE DRAWINGS

Further features and advantages of the present invention will become apparent from the following detailed description, taken in combination with the appended drawings, in which:

FIG. 1 is a cross-sectional view showing one embodiment of the present invention, wherein the automatic coffee brewing apparatus is in the brewing position, while

DETAILED DESCRIPTION OF THE PREFERRED EMBODIMENT

Figure 1:
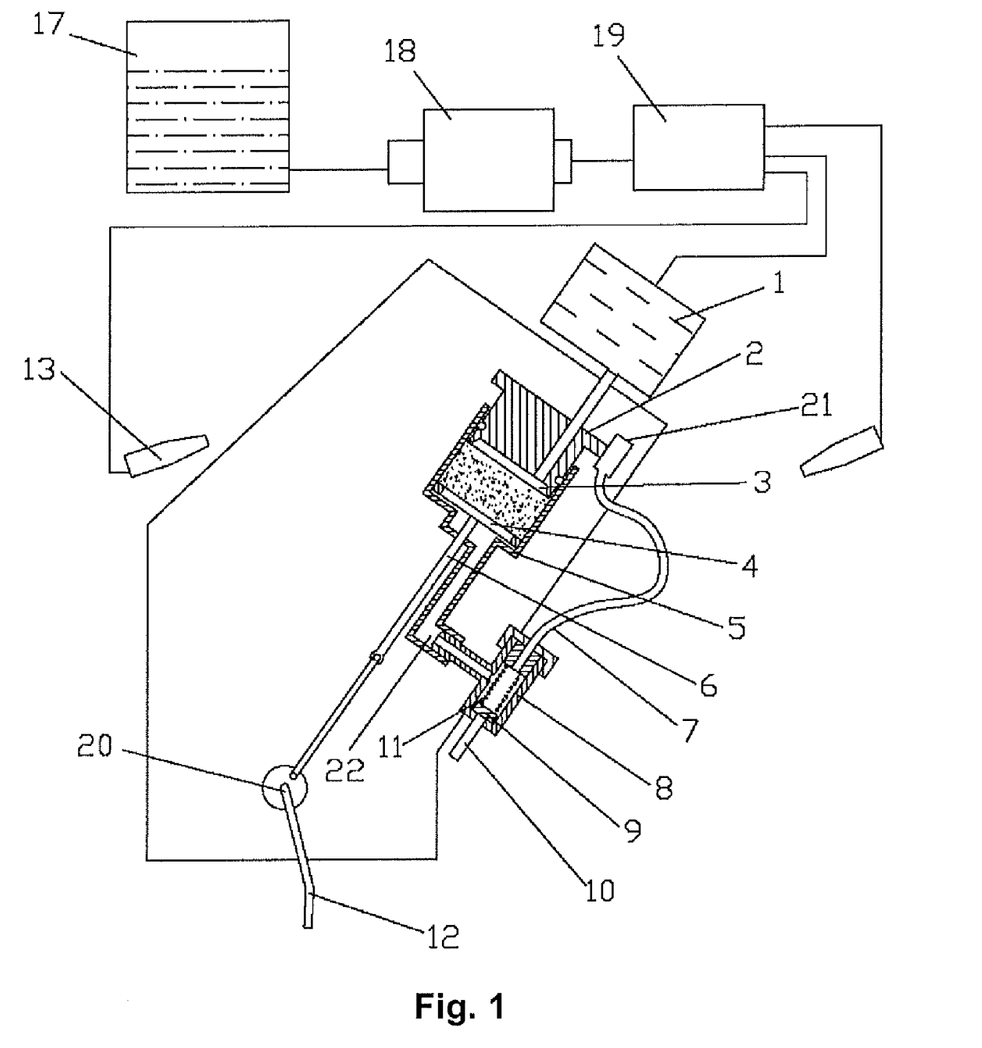
Figure 2:
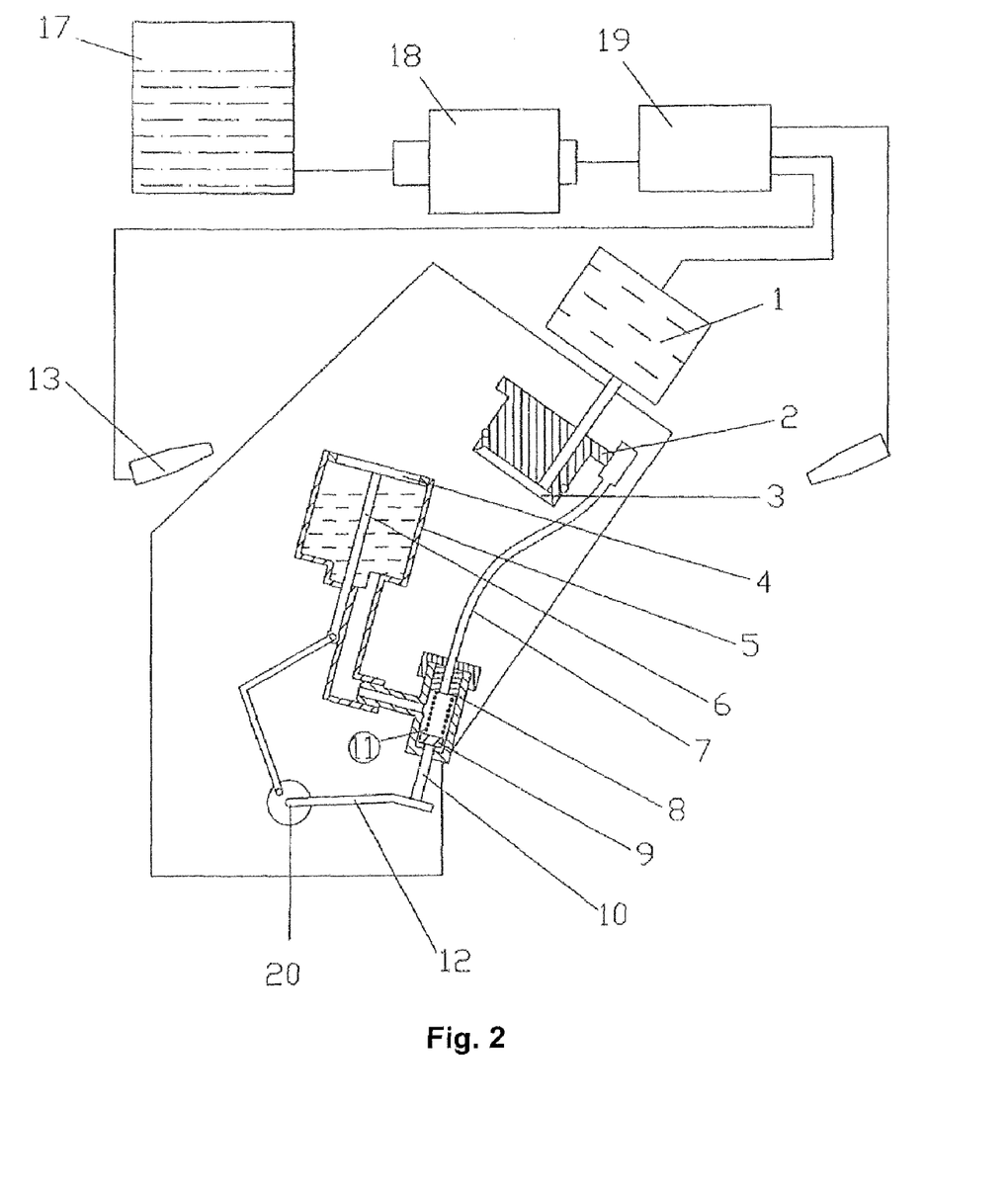
FIG. 2 is a cross-sectional view showing the automatic coffee brewing apparatus of FIG. 1 in the residue discharge position.
Figure 3:
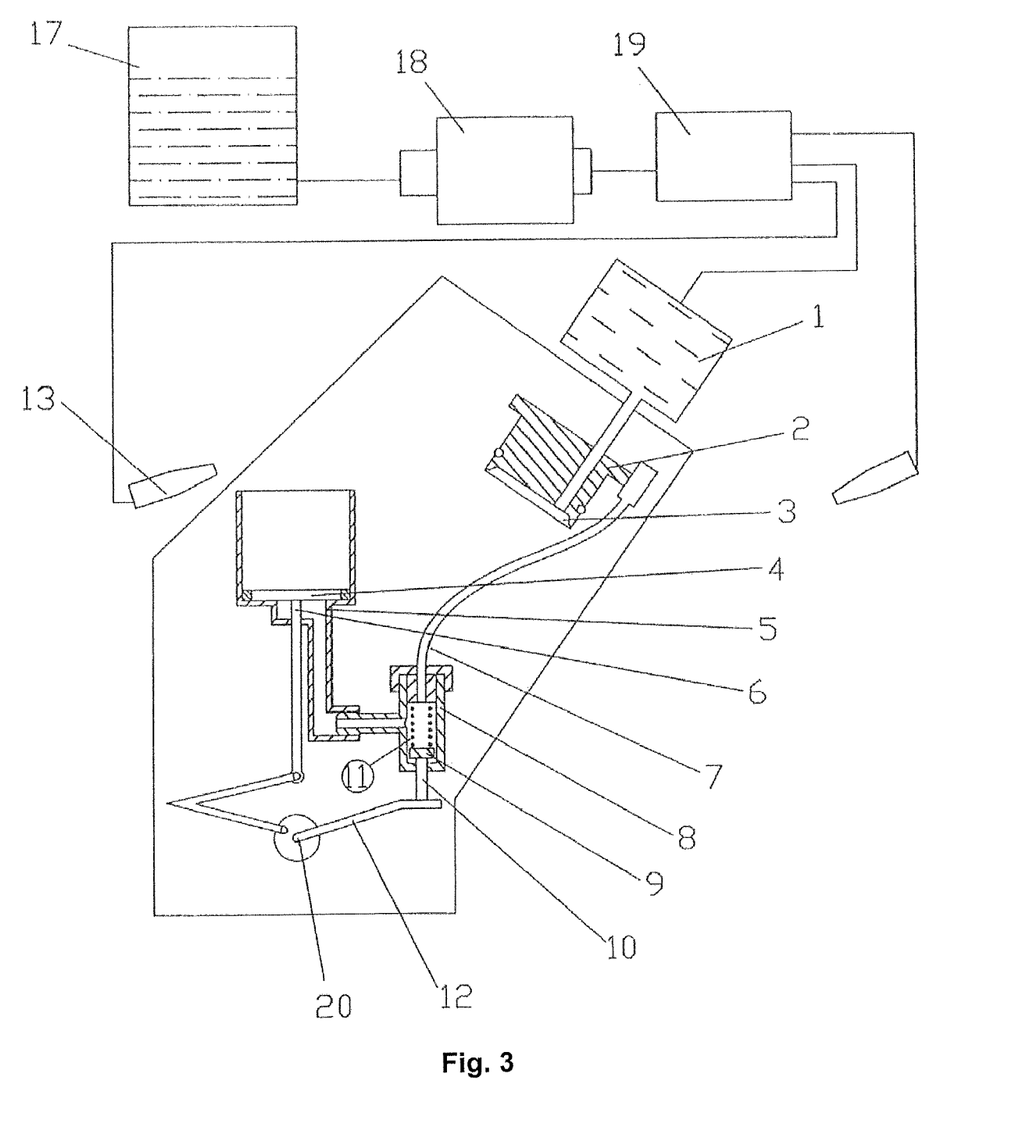
FIG. 3 is a cross-sectional view showing the automatic coffee brewing apparatus of FIG. 1 in the position for receiving coffee grounds.

As shown in FIG. 1, FIG. 2 and FIG. 3, according to one embodiment of the present invention, the automatic coffee brewing apparatus comprises a control circuit and a water loop comprising a water reservoir 17, a pump 18, a control valve 19, a boiler 1, a brewing assembly, a three-way connector 8 and a connecting hose 7.

The brewing assembly comprises a brewing chamber cover 2, a brewing chamber 5, an upper filter 3 and a lower filter 4. The upper filter 3 and the lower filter 4 are disposed inside the brewing chamber 5, and coffee grounds are accommodated between the upper filter 3 and the lower filter 4 when coffee is to be brewed.

The lower filter 4, brewing chamber 5 and three-way connector 8 constitute the brewing core, said brewing core can be rotated about a pivot axis 20, so that the brewing chamber 5 can reciprocate between the brewing position and the position for receiving coffee grounds. In the brewing position, the brewing chamber cover 2 is closed on the brewing chamber 5, and the coffee grounds are accommodated and compacted between the upper filter 3 and the lower filter 4. While in the position for receiving coffee grounds, the brewing chamber cover 2 is separated from the brewing chamber 5, and the lower filter 4 is positioned at the bottom inside the brewing chamber 5.

Figure 1A:
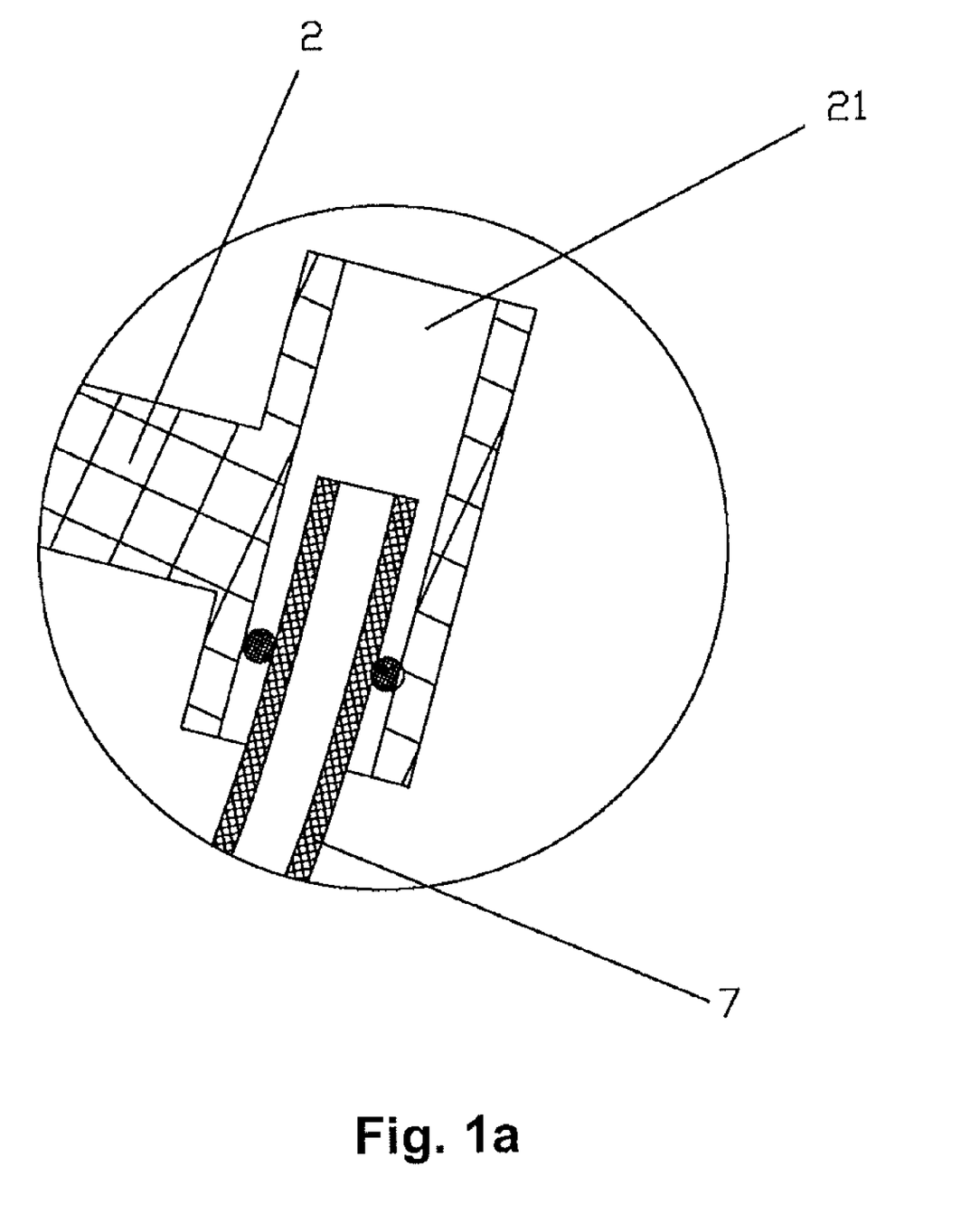
FIG. 1a shows a magnification of the cross-sectional view in the area of brewing chamber cover.

The brewing chamber 5 has a chamber outlet 22 at its bottom, which is connected with the first port of the three-way connector 8, wherein the second port of the three-way connector 8 is connected with one end of the connecting hose 7, and wherein a plunger assembly is installed at the third port of the three-way connector 8. Another end of the connecting hose 7 is connected to a through hole 21 on the brewing chamber cover 2 opening to a coffee outlet. Alternatively, a hose sleeve may be installed between the brewing chamber cover 2 and the connecting hose 7. Said hose sleeve has an inner hole for accommodating the end of the connecting hose 7 and allowing it to slide there within. A sealing ring is installed inside the inner hole of the hose sleeve and around the end of the connecting hose 7, so as to prevent the leakage of the brewed coffee. The inner hole of the hose sleeve is opened to the through hole 21 on the brewing chamber cover 2. Detail of the connecting hose 7 in relation to through hole 21 is shown in FIG. 1a.

The plunger assembly of the three-way connector 8 comprises a drain actuator stem 12, a drain gasket 9, a drain plunger stem 10 connected with the bottom of the drain gasket 9, and a compression spring 11 installed above the drain gasket 9. One end of the drain actuator stem 12 is fixed on the pivot axis 20 of the brewing core, and can be rotated about said pivot axis 20. The drain actuator stem 12 can be rotated to the position where it pushes the drain plunger stem 10 to drive the drain gasket 9 moving upwards to compress the compression spring 11, so that the third port of the three-way connector 8 is opened. The drain actuator stem 12 can be rotated to the position where it detaches from the drain plunger stem 10. At this position, under the resilient force of the compression spring 11, the drain gasket 9 is pushed downwards, so that the third port of the three-way connector 8 is closed.

A connecting rod 6 is connected to the bottom of the lower filter 4, and a through hole is provided at the bottom of the brewing chamber 5, so that said connecting rod 6 passes through said hole and is connected with the pivot axis 20 of the brewing core. The connecting rod 6 is capable of moving the lower filter 4 up and down the brewing chamber 5. The position where the lower filter 4 arrives at the top of the brewing chamber 5 is called the residue discharge position. A sealing ring is disposed at the periphery of the through hole at the bottom of the brewing chamber 5, so as to prevent the coffee grounds and water from flowing out through the gap at the periphery of the through hole.

Figure 4:
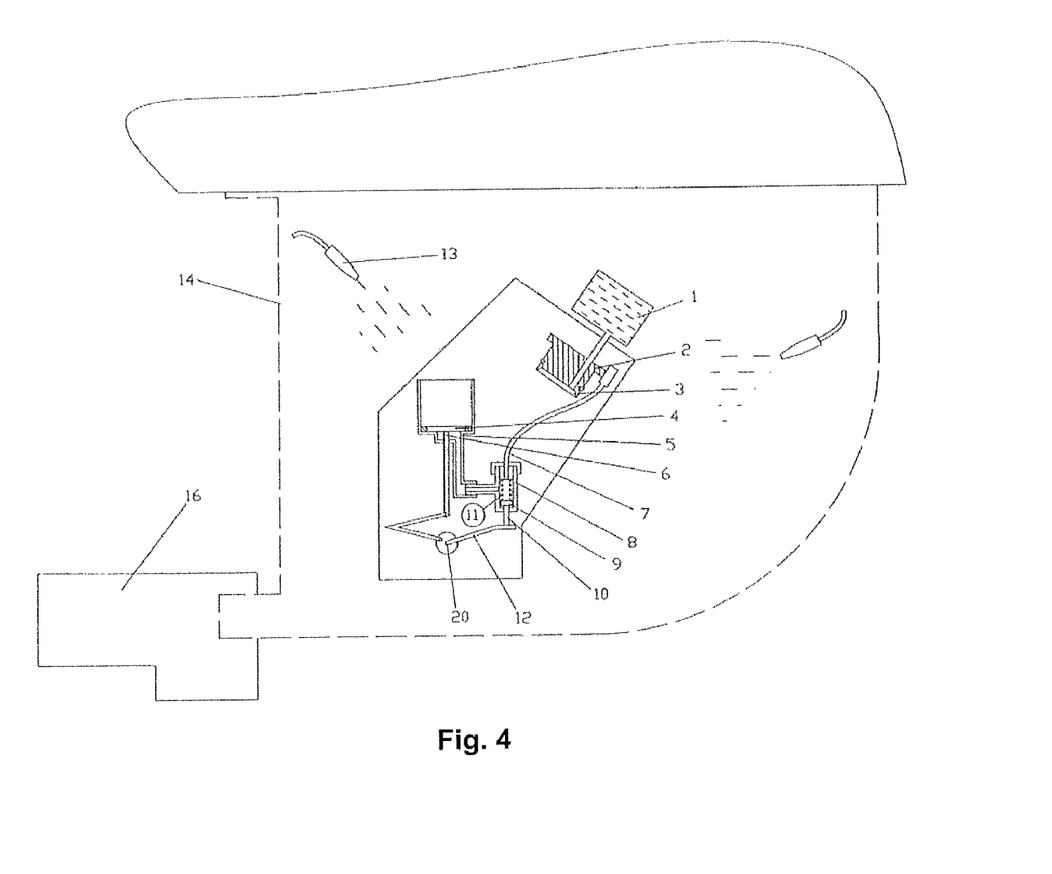
FIG. 4 is a cross-sectional view showing the external structure of the automatic coffee brewing apparatus of FIG. 1.

As shown in FIG. 4, several jet nozzles 13 connected with the pump 18 through the control valve 19 are provided around the brewing core. There are more than one jet nozzles 13 located at different positions relative to the brewing chamber 5. A water-proof cover 14 is further provided covering the brewing core and the jet nozzles 13. In addition, a drain pan 16 is provided, the water-proof cover 14 having a water collecting outlet opening to the drain pan 16.

Figure 5:
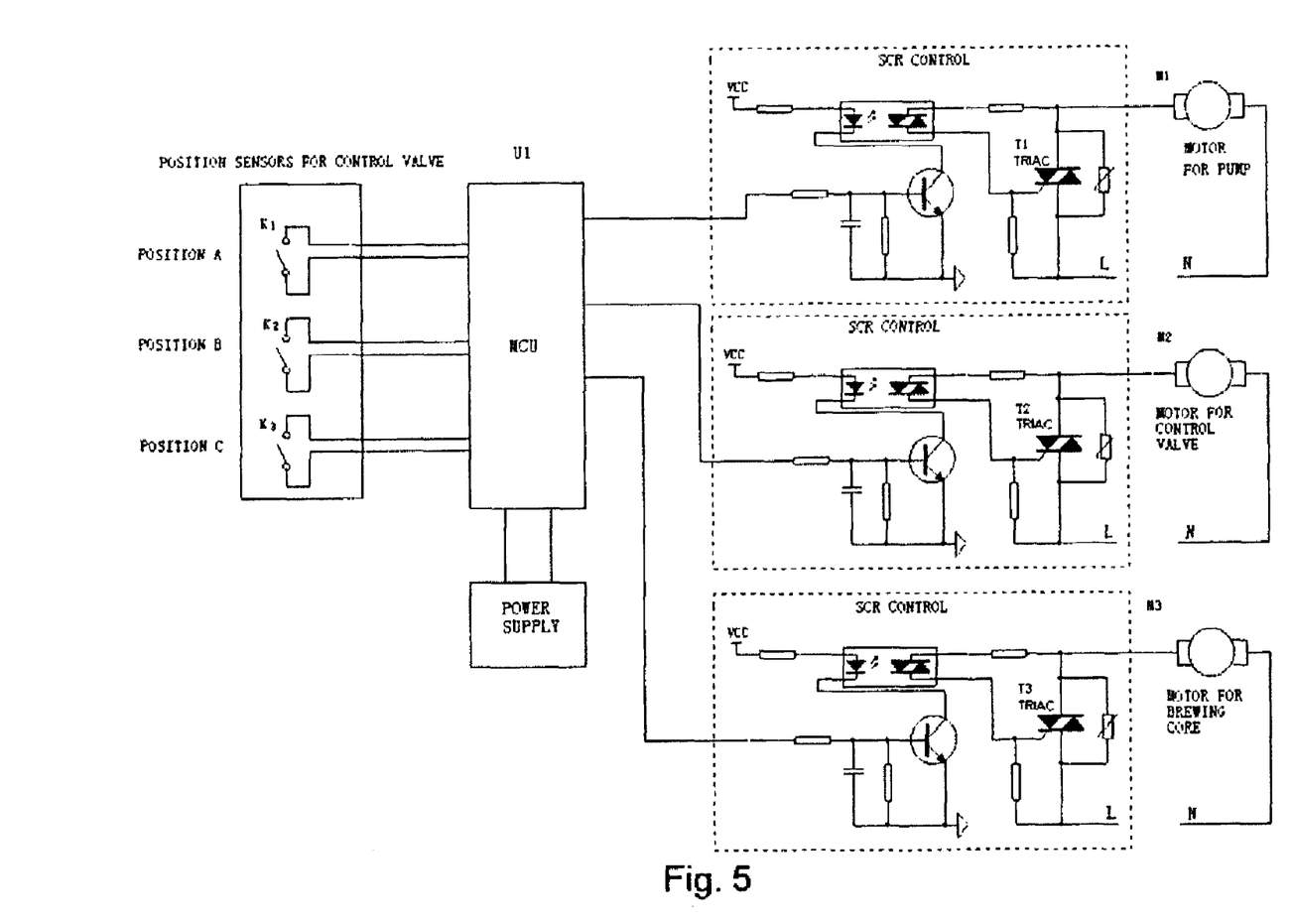
FIG. 5 is the schematic diagram of the control circuit of the automatic coffee brewing apparatus of FIG. 1; and, FIG. 6 is the control flow diagram for automatic cleaning of the automatic coffee brewing apparatus of FIG. 1.

As shown in FIG. 5, the control circuit comprises a micro controller unit (MCU), a pump control circuit, a control valve control circuit, a brewing core control circuit and position sensors.

The pump control circuit for controlling the operation of the pump comprises a motor M1 and a thyristor circuit T1, wherein one end of the motor M1 is connected to MCU via the thyristor circuit T1.

The control valve control circuit for controlling the operation of the control valve comprises a motor M2 and a thyristor circuit T2, wherein one end of the motor M2 is connected to MCU via the thyristor circuit T2.

The brewing core control circuit for controlling the rotational position of the brewing core comprises a motor M3 and a thyristor circuit T3, wherein one end of the motor M3 is connected to MCU via the thyristor circuit T3.

There are more than one position sensors K1, K2, K3, for sensing the position of the brewing chamber during its movement. The position sensors K1, K2, K3 are connected with different input ports of MCU respectively. A micro-movement switch or a proximity switch can be used as the position sensor.

When coffee is to be brewed, coffee grounds are introduced into the brewing core which is at the position for receiving coffee grounds. Then the brewing chamber 5 moves to the brewing position and the coffee grounds are compacted. Under the control of the control circuit, the pump 18 begins to work, and the third port of the three-way connector 8 is closed. Hot water from the boiler 1 flows top-down through the brewing chamber cover 2, the upper filter 3, the coffee grounds, the lower filter 4, the brewing chamber 5, the first port of the three-way connector 8, the second port of the three-way connector 8 and the connecting hose 7. The brewed coffee finally flows out from the connecting hose 7.

After the brewed coffee has flowed out, the brewing core is rotated about the pivot axis 20 under the control of the control circuit, so that the brewing chamber 5 is separated from the brewing chamber cover 2. At this time, under the control of the connecting rod 6 connected at the bottom of the lower filter 4, the lower filter 4 moves inside the brewing chamber 5 to the residue discharge position so as to discharge the residues automatically. Under the control of the control circuit, the brewing core continues to be rotated to the position for receiving coffee grounds, and the third port of the three-way connector 8 is opened. Before the brewing chamber 5 is returned to the position for receiving coffee grounds, under the control of the connecting rod 6 connected at the bottom of the lower filter 4, the lower filter 4 undergoes a quick return motion from the residue discharge position to the bottom inside the brewing chamber 5, which generates an impact to cause the waste water remaining in the brewing chamber 5 under the filter to flush the filter, such that the waste water is discharged automatically and the filter is cleaned automatically.

By means of programmed control, this automatic coffee brewing apparatus has an automatic cleaning function, including cleaning of the interior and the exterior of the brewing core.

Figure 6:
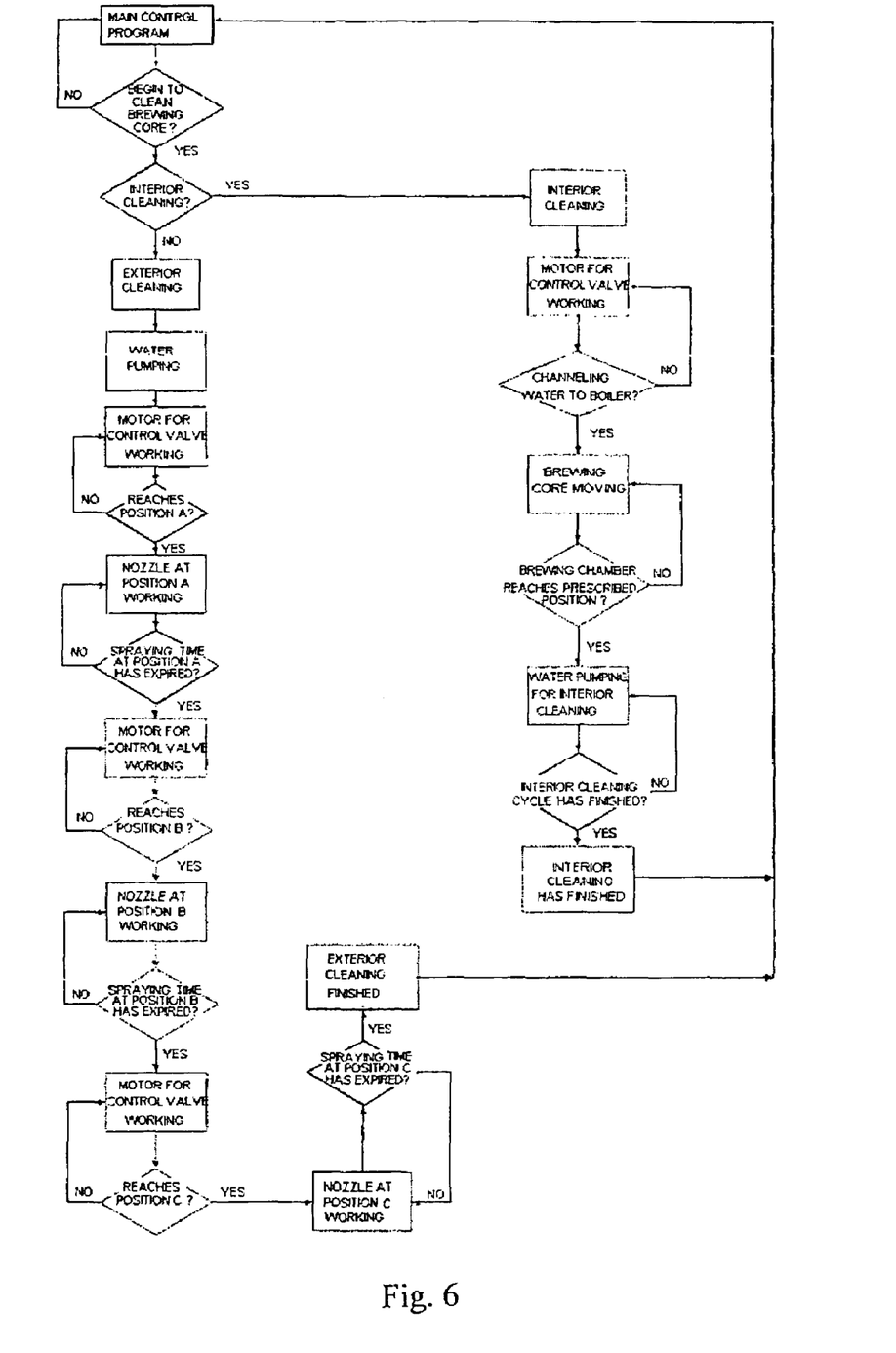

As shown in FIG. 6, the automatic cleaning procedures are as follows:

According to the user's command, MCU decides whether to begin interior cleaning or exterior cleaning.

If interior cleaning is to be performed, motor M2 begins to work under the control of the MCU via thyristor circuit T2, and the water channel towards the boiler 1 is opened by the control valve. Then, motor M3 begins to work under the control of the MCU via thyristor circuit T3, and the brewing core without coffee grounds is rotated. When the brewing core is rotated to the brewing position, MCU receives the signal sent out by the position sensor, and motor M1 begins to work under the control of the MCU via thyristor circuit T1, so that water is pumped from the water reservoir 17 and hot water is injected into the brewing chamber 5 via the brewing chamber cover 2.

Then, the following procedures of interior cleaning are started under the programmed control:

The brewing core is rotated about the pivot axis 20, so that the brewing chamber 5 is separated from the brewing chamber cover 2. At this time, activated by the connecting rod 6 connected at the bottom of the lower filter 4, the lower filter 4 moves inside the brewing chamber 5 to the residue discharge position so as to discharge the residues automatically. Under the control of the control circuit, the brewing core continues to be rotated to the position for receiving coffee grounds, and the third port of the three-way connector 8 is opened; before the brewing chamber 5 is returned to the position for receiving coffee grounds, activated by the connecting rod 6 connected at the bottom of the lower filter 4, the lower filter 4 undergoes a quick return motion from the residue discharge position to the bottom inside the brewing chamber 5, which generates an impact to cause the waste water remaining in the brewing chamber under the filter to flush the filter so that the waste water is discharged automatically and the filter is cleaned automatically.

When the interior cleaning procedures are finished, the logic returns to the main control program.

If cleaning of the exterior is to be performed, motor M1 begins to work under MCU control of the thyristor circuit T1, and water is pumped from the water reservoir 17. Then, motor M2 begins to work under the control of the MCU via thyristor circuit T2. Water is channeled to the jet nozzles 13 via the control valve 19, and water is ejected through the jet nozzles 13, so as to realize the exterior cleaning of the brewing core.

The thyristor circuit T3 under the control of MCU drives motor M3 to make the brewing core rotate. The MCU receives signals sent out by the position sensors, so as to control the operation of motor M2 according to the different positions of the moving brewing chamber, and make the jet nozzles 13 at different positions spray at different time intervals.

When the brewing chamber 5 moves to position A, MCU receives the signal sent out by the position sensor K1, and controls the operation of the motor M2 so as to make the jet nozzle at position A to spray.

When the brewing chamber 5 moves to position B, MCU receives the signal sent out by the position sensor K2, and controls the operation of the motor M2 so as to make the jet nozzle at position B to spray.

When the brewing chamber 5 moves to position C, MCU receives the signal sent out by the position sensor K3, and controls the operation of the motor M2 so as to make the jet nozzle at position C to spray.

Thus, the exterior of the brewing chamber is automatically cleaned at different positions during the course of the movement of the brewing chamber.

What is claimed is:

1. An automatic coffee brewing apparatus, comprising:
  a control circuit;
  a water loop including:
  a water reservoir, a pump, a control valve, a boiler, a brewing assembly, a three-way connector having a first, a second and a third port and a connecting hose; wherein said brewing assembly includes a brewing chamber cover, a brewing chamber, an upper filter and a lower filter, wherein said upper filter and lower filter are disposed inside said brewing chamber, and wherein coffee grounds are accommodated between said upper filter and lower filter when coffee is to be brewed;
    wherein said lower filter, brewing chamber and three-way connector constitute the brewing core, and wherein said brewing core is rotatable about a pivot axis, so that the brewing chamber can assume one of a brewing position and a position for receiving coffee grounds; wherein in the brewing position, the brewing chamber cover is closed on the brewing chamber, and the coffee grounds are accommodated and compacted between the upper filter and the lower filter; while in the position for receiving coffee grounds, the brewing chamber cover is separated from the brewing chamber, and the lower filter is positioned at the bottom inside the brewing chamber;
    wherein said brewing chamber has a chamber outlet at its bottom, which is connected with the first port of said three-way connector; wherein a second port of said three-way connector is connected with one end of said connecting hose, wherein a plunger assembly is installed for opening and closing the third port of said three-way connector; said plunger assembly of the three-way connector comprising a drain actuator stem, a drain gasket, a drain plunger stem connected with the bottom of the drain gasket, and a compression spring installed above the drain gasket, wherein one end of the drain actuator stem is fixed on the pivot axis of the brewing core, and can be rotated about said pivot axis, wherein the drain actuator stem can be rotated to the position where it pushes the drain plunger stem to drive the drain gasket upwards to compress the compression spring, so that the third port of the three-way connector is opened, wherein the drain actuator stem can be rotated to a position where it separates from the drain plunger stem, wherein the drain gasket is pushed downwards under the resilient force of the compression spring, so that the third port of the three-way connector is closed;

wherein another end of said connecting hose is connected to a through hole on the brewing chamber cover opening to a coffee outlet;

wherein, when coffee is to be brewed:
a) coffee grounds are accommodated between the upper and lower filters,
b) the third port of said three-way connector is closed,
c) hot water flows top-down through the brewing chamber cover, the upper filter, the coffee grounds, the lower filter, the brewing chamber, the first port of the three-way connector, the second port of the three-way connector and the connecting hose;
d) the brewed coffee finally flows through said connecting hose out of the coffee outlet; and,
after the brewed coffee has flowed out, the third port of the three-way connector is opened under the control of the control circuit, wherein waste water remaining in the brewing chamber is discharged from the third port of the three-way connector through the lower filter, the brewing chamber and the first port of the three-way connector.

2. A coffee brewing apparatus according to claim 1, wherein a connecting rod is connected to the bottom of the lower filter, and a through hole is provided at the bottom of the brewing chamber, so that, said connecting rod passes said through hole and is connected with the pivot axis of the brewing core, wherein under the control of the control circuit, said connecting rod is capable of driving the lower filter to move up and down the brewing chamber, and wherein in a residue discharge position, the lower filter arrives at the top of the brewing chamber, and wherein a sealing ring is disposed at the inner periphery of the through hole at the bottom of the brewing chamber, so as to prevent the coffee grounds and water from flowing out through the gap at the periphery of the through hole.

3. A coffee brewing apparatus according to claim 1, wherein said control circuit comprises a MCU, a pump control circuit, a control valve control circuit, a brewing core control circuit and a plurality of position sensors;

wherein said pump control circuit for controlling the operation of the pump comprises a motor M1 and a thyristor circuit T1, wherein one end of the motor M1 is connected to MCU via the thyristor circuit T1;

wherein said control valve control circuit for controlling the operation of the control valve comprises a motor M2 and a thyristor circuit T2, wherein one end of the motor M2 is connected to MCU via the thyristor circuit T2;

wherein said brewing core control circuit for controlling the rotational position of the brewing core comprises a motor M3 and a thyristor circuit T3, wherein one end of the motor M3 is connected to MCU via the thyristor circuit T3;

wherein the plurality of position sensors is used for sensing the position of the brewing chamber during its movement; said position sensors are connected to different input ports of MCU respectively.

4. A coffee brewing apparatus according to claim 3, wherein at least one jet nozzle connected with said pump through the control valve is provided around said brewing core, wherein a water-proof cover is further provided covering the brewing core and the at least one jet nozzle; in addition, a drain pan is provided, wherein said water-proof cover has a water collecting outlet opening to said drain pan.

5. A control method for controlling the coffee brewing apparatus defined in claim 2, comprising the following steps:
after the brewed coffee has flowed out, under the control of the control circuit, the brewing core is rotated about the pivot axis, so that the brewing chamber is separated from the brewing chamber cover; then the connecting rod connected at the bottom of the lower filter, moves the lower filter inside the brewing chamber to the residue discharge position so as to discharge the residues automatically; under the control of the control circuit, the brewing core continues to be rotated toward the position for receiving coffee grounds, and the third port of the three-way connector is opened; before the brewing chamber is returned to the position for receiving coffee grounds, under the control of the connecting rod connected to the bottom of the lower filter, the lower filter undergoes a quick return motion from the residue discharge position to the bottom inside the brewing chamber, which generates an impact to cause the waste water remaining in the brewing chamber under the filter to flush the filter, such that the waste water is discharged automatically and the filter is cleaned automatically.

6. The control method of the coffee brewing apparatus according to claim 4, further comprising the steps of cleaning an interior of the brewing core, said steps including:
rotating the brewing core without coffee grounds under the control of the control circuit;
injecting hot water into the brewing chamber when the brewing core is rotated to the brewing position;
rotating the brewing core about the pivot axis, so as to separate the brewing chamber from the brewing chamber cover;
under the control of the connecting rod connected to the bottom of the lower filter, moving the lower filter inside the brewing chamber to the residue discharge position so as to discharge the residues automatically;
wherein under the control of the control circuit, the brewing core continues to be rotated toward the position for receiving coffee grounds, and the third port of the three-way connector is opened, wherein before the brewing chamber is returned to the position for receiving coffee grounds, under the control of the connecting rod connected to the bottom of the lower filter, the lower filter undergoes a quick return motion from the residue discharge position to the bottom inside the brewing chamber, suitable for generating an impact to cause the waste water remaining in the brewing chamber under the filter to flush the filter, such that the waste water is discharged automatically and the filter is cleaned automatically.

7. A control method for controlling the coffee brewing apparatus defined in claim 4, comprising the following steps:

initiating cleaning of one of an interior and an exterior of the brewing core in dependence upon a user's input to the MCU;

if interior cleaning is to be performed, motor M2 begins to work under the control of the MCU via thyristor circuit T2, and a water channel towards the boiler is opened by the control valve;

then, motor M3 begins to work under the control of the MCU via thyristor circuit T3, and the brewing core without coffee grounds is rotated;

when the brewing core is rotated to the brewing position, the MCU receives a signal sent out by the position sensor, and motor M1 begins to work under the control of the MCU via thyristor circuit T1, so that water is pumped from the water reservoir and hot water is injected into the brewing chamber via the brewing chamber cover;

then, the procedures for interior cleaning are started under the programmed control;

when the interior cleaning procedures are finished, returning to a main control program;

if the exterior cleaning is to be performed, motor M1 begins to work under the control of the MCU via thyristor circuit T1, and water is pumped from the water reservoir;

then, motor M2 begins to work under the control of the MCU via thyristor circuit T2; water is channeled to the at least one jet nozzle via the control valve, and water is ejected through the at least one jet nozzle, so as to realize the exterior cleaning of the brewing core.

8. The control method of the coffee brewing apparatus according to claim 7, wherein, more than one jet nozzles connected with said pump through the control valve are provided at different positions around said brewing core; when the exterior cleaning is to be performed, the thyristor circuit T3, under the control of MCU, drives motor M3 to rotate the brewing core; the MCU receives signals sent out by the position sensors, so as to control the operation of motor M2 according to different positions of the moving brewing chamber, and cause the jet nozzles at different positions to spray at different time intervals.

9. An automatic coffee brewing apparatus, comprising:
a control circuit;
a water loop including:
a water reservoir, a pump, a control valve, a boiler, a brewing assembly, a three-way connector having a first, a second and a third port and a connecting hose; wherein said brewing assembly includes a brewing chamber cover, a brewing chamber, an upper filter and a lower filter, wherein said upper filter and lower filter are disposed inside said brewing chamber, and wherein coffee grounds are accommodated between said upper filter and lower filter when coffee is to be brewed; wherein said brewing chamber has a chamber outlet at its bottom, which is connected with the first port of said three-way connector; wherein a second port of said three-way connector is connected with one end of said connecting hose, wherein a plunger assembly is installed for opening and closing at the third port of said three-way connector; wherein another end of said connecting hose is connected to a through hole on the brewing chamber cover opening to a coffee outlet;

at least one jet nozzle connected with said pump through the control valve, which is provided around a brewing core comprising said lower filter, brewing chamber and three-way connector;

a drain pan; and a waterproof cover covering all the jet nozzles, wherein said waterproof cover has a water collecting outlet opening to said drain pan.

10. A control method for controlling the coffee brewing apparatus defined in claim 9, comprising the following step:
spraying with the at least one jet nozzle installed around the brewing core under the control of the control circuit, so as to clean an exterior of the brewing core.

* * * * *